United States Patent [19]

Hanma et al.

[11] 4,062,044
[45] Dec. 6, 1977

[54] COLOR TELEVISION RECEIVER EMPLOYING ELASTIC SURFACE WAVE FILTER

[75] Inventors: Kentaro Hanma, Yokohama; Gentaro Miyazaki, Fujisawa, both of Japan

[73] Assignee: Hitachi, Ltd., Japan

[21] Appl. No.: 655,854

[22] Filed: Feb. 6, 1976

[30] Foreign Application Priority Data

| Feb. 7, 1975 | Japan | 50-15353 |
| Feb. 14, 1975 | Japan | 50-17893 |
| Feb. 14, 1975 | Japan | 50-17895 |
| Feb. 19, 1975 | Japan | 50-19737 |
| Feb. 19, 1975 | Japan | 50-19738 |
| Feb. 19, 1975 | Japan | 50-19739 |

[51] Int. Cl.² .................................... H04N 9/535
[52] U.S. Cl. ........................................ 358/21; 358/31
[58] Field of Search .................... 358/31, 188, 21; 178/7.3 R; 310/9.8; 333/72; 329/50

[56] References Cited

U.S. PATENT DOCUMENTS

3,726,990   4/1973   Adler et al. .................... 358/31

Primary Examiner—John C. Martin
Attorney, Agent, or Firm—Craig & Antonelli

[57] ABSTRACT

A color television receiver in which a first transducer is disposed on a substrate of piezoelectric-material for converting a color television signal including a luminance signal, color-difference signals, a sound signal and a picture carrier into an elastic surface wave. A second, a third, a fourth and a fifth transducer are disposed on the substrate for converting the elastic surface wave propagating from the first transducer into electrical signals respectively including solely the luminance signal component, color-difference signal component, sound signal component and picture carrier component of the color television signal. The electrical signal including solely the luminance signal component and the electrical signal including solely the picture carrier component are applied to a first synchronous detector for the synchronous detection of the luminance signal component, and the electrical signal including solely the color-difference signal component and the electrical signal including solely the picture carrier component are applied to a second synchronous detector for the synchronous detection of the color-difference signal component, while the electrical signal including solely the sound signal component and the electrical signal including solely the picture carrier component are applied to a third synchronous detector for the synchronous detection of the sound signal component.

16 Claims, 11 Drawing Figures

COLOR TELEVISION RECEIVER EMPLOYING ELASTIC SURFACE WAVE FILTER

This invention relates to a color television receiver of the kind in which luminance information and chrominance information are separately extracted from a received color television signal.

Coils and capacitors have been used hitherto in conventional color television receivers so as to provide the selectivity required for the color television receivers. Filters and traps composed of the combination of such coils and capacitors are generally used in conventional color television receivers for providing the selectivity required for the color television receivers, and these elements must be carefully finely adjusted in order to exhibit the desired operating characteristics. Difficulty has been encountered in integrating these filters and traps into integrated circuit form although integration of such elements has been strongly demanded, and especially, extreme difficulty has been encountered in integrating the coils into desired integrated circuit form. In the meantime, it is reported, in IEEE Trans., BTR-17, No. 1, pp 16–23 (1971), that an intermediate frequency filter in a color television receiver can be provided by an elastic surface wave filter having a construction in which a comb-shaped transducer is formed on a substrate of piezoelectric material. However, although such elastic surface wave filter can be expediently used as intermediate frequency filters in color television receivers, this does not solve all the problems presently encountered.

The reasons therefor will be described with reference to FIG. 1 which is a block diagram showing the structure of a conventional color television receiver of the type employing the intercarrier system.

Figure 1:
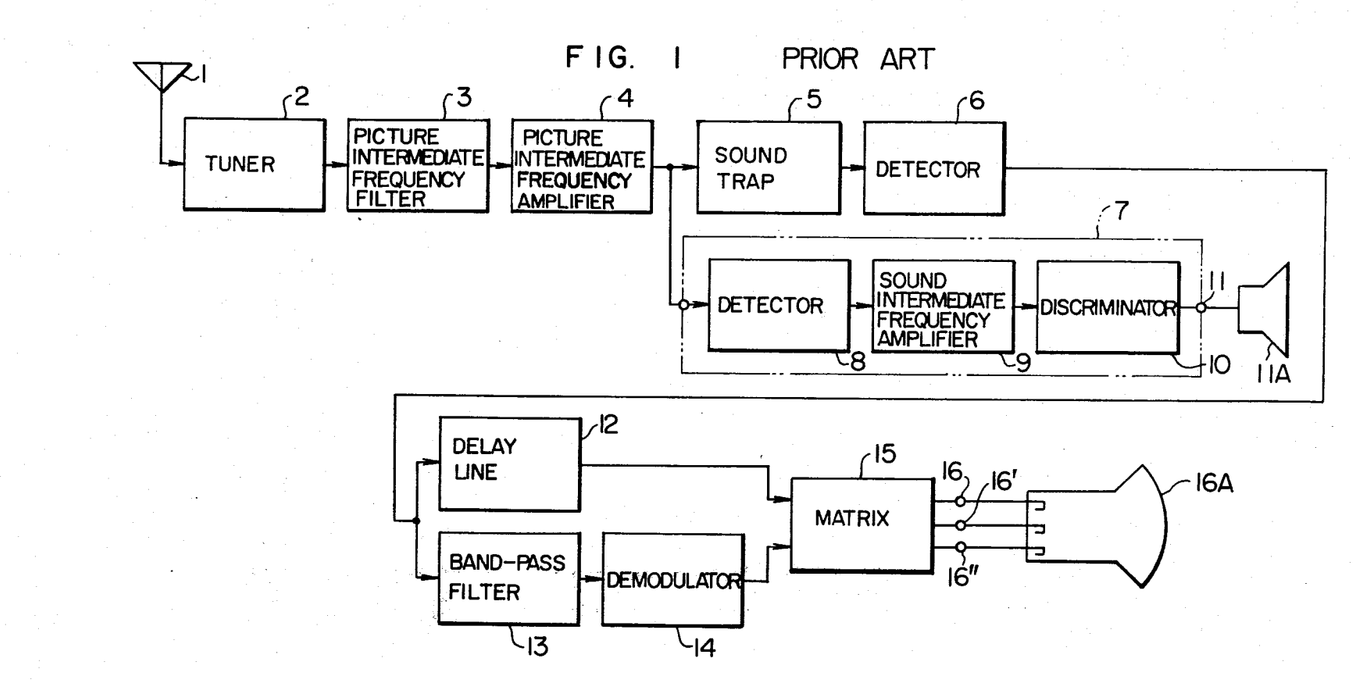
FIG. 1 is a block diagram showing the structure of a prior art color television receiver.

Referring to FIG. 1, a color television signal transmitted from a TV broadcasting station is received by an antenna 1, and after being converted into a picture intermediate frequency by a tuner 2, it is applied to a picture intermediate frequency filter 3. The color television signal output of the picture intermediate frequency filter 3 is amplified by a picture intermediate frequency amplifier 4 and is then applied to a sound trap 5 and to a detector 8 in a sound circuit 7. Since the color television receiver is of the type employing the intercarrier system, the sound signal subjected to frequency conversion is included in the output of the amplifier 4. Therefore, the output of the sound intermediate frequency amplifier 4 is subjected to envelope detection in the detector 8 to obtain a sound intermediate frequency signal at the output terminal of the detector 8. This sound intermediate frequency signal is amplified by a sound intermediate frequency amplifier 9 and is then subjected to FM detection in a discriminator 10 to be finally applied to a speaker 11A from an output terminal 11.

On the other hand, the luminance signal and chrominance signal in the picture intermediate frequency signal applied to the sound trap 5 are detected by another detector 6, and the output of this detector 6 is applied to a delay line 12 and to a band-pass filter 13. The output of the detector 6 includes both the luminance signal and the chrominance signal. The band-pass filter 13 separates the chrominance signal from the luminance signal and permits passage of the chrominance signal only therethrough. The chrominance signal output of the band-pass filter 13 is demodulated by a chrominance signal demodulating circuit 14 to provide the color-difference signals, and these color-difference signals are applied to a matrix circuit 15 together with the luminance signal applied from the delay line 12 to provide the three primary color signals which are applied to the cathode of a color cathode-ray tube 16A from three terminals 16, 16' and 16". The delay line 12 is disposed in the system so as to prevent color misalignment on the televised picture, because the chrominance signal passing through the band-pass filter 13 is delayed relative to the luminance signal by a slight delay time of, for example, about 0.5 $\mu$sec resulting in a delay of the color-difference signals relative to the luminance signal.

The sound trap 5 is necessary for the reasons described below. When the sound carrier in the input applied to the detector 6 is insufficiently attenuated, a beat signal having a frequency of, for example, 920 kHz representing the frequency difference between the sound carrier and the chrominance subcarrier is generated in the detector 6 tending to impart an objectionable adverse effect to the televised picture being displayed. In a modern color television receiver, therefore, the sound carrier is generally attenuated by 50 to 60 dB relative to the picture carrier. On the other hand, in the color television receiver of the type shown in FIG. 1, excessive attenuation of the sound carrier tends to reduce the level of the beat signal of, for example, 4.5 MHz providing the sound intermediate frequency signal after being detected by the detector 8, with the result that the sound circuit 7 may not sufficiently respond to the sound signal.

In the color television receiver of the type shown in FIG. 1, therefore, the sound carrier is attenuated by about 26 dB in the picture intermediate frequency filter 3, and after the amplification in the picture intermediate frequency amplifier 4, the output of the amplifier 4 is supplied to the sound circuit 7 for the full reproduction of the sound signal. At the same time, the output of the picture intermediate frequency amplifier 4 is applied to the sound trap 5 which suppresses the sound carrier so that the sound carrier attenuated by about 26 dB in the picture intermediate frequency filter 3 can be further attenuated by about 20 to 30 dB for attaining the desired purpose.

In the color television receiver of FIG. 1 employing the intercarrier system, the elements including the picture intermediate frequency filter 3, sound trap 5 and band-pass filter 13 are composed of the coil-capacitor combination. Extreme difficulty is encountered in integrating these elements into integrated circuit form as described hereinbefore, and careful adjustment of the characteristic is required for each of these elements during assembling of the color television receiver as described hereinbefore. Therefore, even when the picture intermediate frequency filter 3 in the form of the elastic surface wave filter is provided so as to eliminate the need for adjustment of the characteristic and to facilitate integration into integrated circuit form, many coils and capacitors remain still in the elements including the band-pass filter 13. The color television receiver shown in FIG. 1 has thus been defective in that all the elements of the signal processing circuit cannot be rendered adjustment-free and the signal processing circuit cannot be integrated into desired integrated circuit form.

It is therefore an object of the present invention to provide a novel and improved color television receiver which eliminates the need for provision of filters consisting of coils and capacitors conventionally used for obtaining the selectivity required for television receivers of this kind, in which the desired selectivity can be obtained without any adjustment of signal processing means, and in which such signal processing means are suitable for integration into integrated circuit form.

Another object of the present invention is to provide a color television receiver which eliminates the need for provision of a delay line used in prior art receivers of this kind, due to the fact that the delay time of the luminance signal transmitted along the path leading to the color display is equal to the delay time of the chrominance signal transmitted along the path leading to the color display.

The present invention which attains the above objects comprises a first transducer mounted on a substrate of piezo-electric material for converting an electrical signal into an elastic surface wave, means for supplying a color television signal including a luminance signal and a chrominance signal to this first transducer thereby producing an elastic surface wave corresponding to the color television signal, a second transducer and a third transducer each disposed on the path of propagation of the elastic surface wave on the substrate for converting the elastic surface wave into an electrical signal so that an electrical signal including the luminance signal but not including the chrominance signal can be derived from the second transducer and an electrical signal including the chrominance signal but not including the luminance signal can be derived from the third transducer, and means for demodulating the respective electrical signal outputs of the second and third transducers.

Further, in the color television receiver having the structure above described, the second and third transducers are disposed relative to the first transducer on the piezo-electric substrate in such a relationship that the sum of the delay time of the luminance signal transmitted in the electrical signal form along the transmission path in the color television receiver and the delay time of the luminance signal propagating in the elastic surface wave form on the piezo-electric substrate is equal to the sum of the delay time of the chrominance signal transmitted in the electrical signal form along the transmission path in the color television receiver and the delay time of the chrominance signal propagating in the elastic surface wave form on the piezo-electric substrate.

The color television receiver of the present invention further comprises a fourth transducer disposed on the propagation path of the elastic surface wave on the substrate for converting the elastic surface wave into an electrical signal so that an electrical signal including the picture carrier only and not including the luminance signal and chrominance signal can be derived from this fourth transducer, and this electrical signal including solely the picture carrier can be utilized for the demodulation of the electrical signal derived from the third transducer.

Other objects, features and advantages of the present invention will become apparent from the following detailed description of preferred embodiments thereof taken in conjunction with the accompanying drawings, in which:

Figure 2:
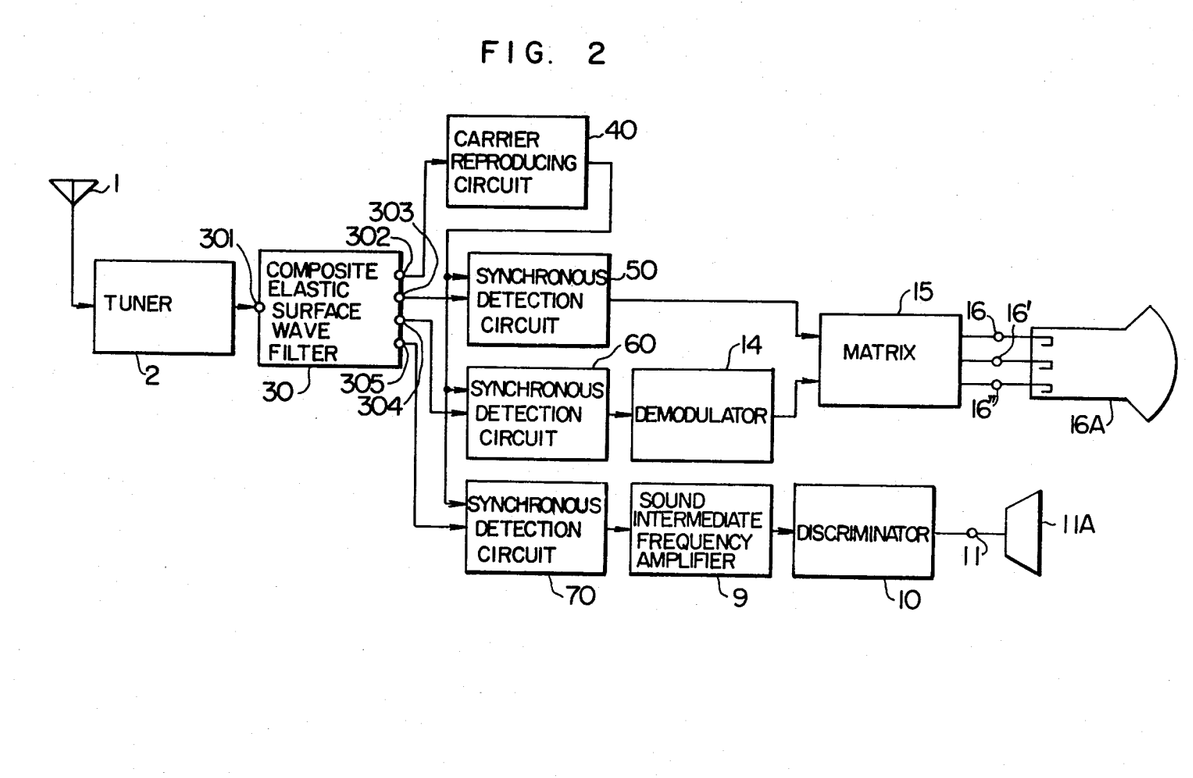
FIG. 2 is a block diagram showing the structure of a preferred embodiment of the color television receiver according to the present invention using an elastic surface wave filter.

Referring now to FIG. 2 showing the structure of a preferred embodiment of the color television receiver according to the present invention, a color television signal including a picture carrier, a luminance signal, a chrominance signal and a sound signal is received by an antenna 1 to be applied to a tuner 2. In the tuner 2, the color television signal is converted into a picture intermediate frequency signal to be applied to an input terminal 301 of a composite elastic surface wave filter 30. In this composite elastic surface wave filter 30, the picture carrier, non-detected luminance signal, chrominance signal and sound signal are separated from one another to appear at respective output terminals 302, 303, 304 and 305. The structure and frequency characteristics of this composite elastic surface wave filter 30 will be described in detail later.

The picture carrier separated in the composite elastic surface wave filter 30 is applied from the output terminal 302 to a carrier reproducing circuit 40, and a reference carrier used for the synchronous detection appears from the carrier reproducing circuit 40. The non-detected luminance signal, chrominance signal and sound signal separated in the composite elastic surface wave filter 30 are applied from the respective output terminals 303, 304 and 305 to synchronous detection circuits 50, 60 and 70 together with the reference carrier to be subject to the synchronous detection. The carrier reproducing circuit 40 is provided for reproducing the picture carrier waveform appearing at the output terminal 302 of the filter 30 into a reference carrier waveform suitable for use for the synchronous detection of the individual signals appearing at the output terminals 303, 304 and 305 of the filter 30. This carrier reproducing circuit 40 comprises an amplifier for amplifying the picture carrier applied from the output terminal 302 of the filter 30 and a limiter for limiting the amplitude of the amplified carrier waveform to a predetermined level. However, this carrier reproducing circuit 40 is not an essential component, and the picture carrier appearing at the output terminal 302 of the filter 30 may be directly utilized for the synchronous detection of the individual signals or for envelope detection described later. Further, this carrier reproducing circuit 40 may be an oscillator such as a so-called phase locked loop type oscillator adapted for free oscillation at an oscillation frequency nearly equal to the frequency of the picture carrier. The oscillation frequency of such oscillator is controlled by an input signal. Thus, when the picture carrier appearing at the output terminal 302 of the filter 30 is used as the input signal, the oscillator can oscillate at the same frequency as that of the picture carrier, and this oscillation output can be used for the synchronous detection of the individual signals above described. The output appearing from the synchronous detection circuit 60 as a result of the synchronous detection is applied to a chrominance signal demodulating circuit 14 and is thus demodulated to provide color-difference signals which are applied to a matrix circuit 15 together with the luminance signal applied from the synchronous detection circuit 50. Thus, the three primary color signals are applied to the cathode of a color cathode-ray tube 16A through respective terminals 16, 16' and 16".

Further, a sound intermediate frequency signal appears from the synchronous detection circuit 70 to be converted into sound information in usual manner.

Figure 3:
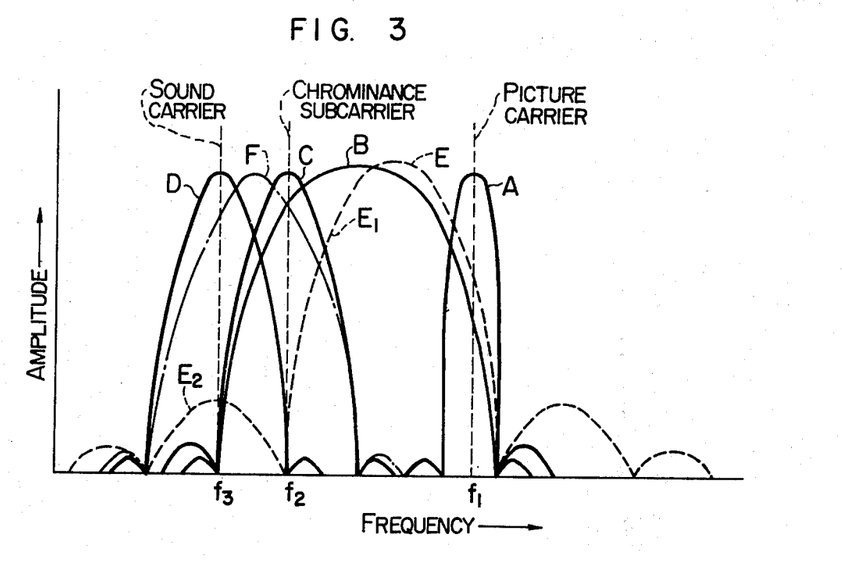
FIG. 3 shows the frequency characteristics of a composite elastic surface wave filter used in preferred embodiments of the present invention.

FIG. 3 shows, by way of example, the frequency characteristics of the composite elastic surface wave filter 30 used in the embodiment shown in FIG. 2. This composite elastic surface wave filter 30 comprises a picture carrier extracting filter formed between the input terminal 301 and the output terminal 302, a luminance signal extracting filter formed between the input terminal 301 and the output terminal 303, a chrominance signal extracting filter formed between the input terminal 301 and the output terminal 304, and a sound signal extracting filter formed between the input terminal 301 and the output terminal 305. The solid curves A, B, C and D in FIG. 3 represent the frequency characteristics of the picture carrier extracting filter, luminance signal extracting filter, color-difference signal extracting filter, and sound signal extracting filter, respectively. The symbols $f_1$, $f_2$ and $f_3$ represent respectively the frequency of the picture carrier, that of the chrominance subcarrier and that of the sound carrier in the picture intermediate frequency signal. According to the present invention, the luminance signal, color-difference signals and sound signal separated by the composite elastic surface wave filter 30 having such frequency characteristics are subjected to the synchronous detection separately from one another using the reference carrier. Thus, the luminance signal subjected to the synchronous detection does not include the sound carrier and the chrominance signal and sound signal subjected to the synchronous detection do not include signal components of unnecessary frequencies. Therefore, in regard to the chrominance signal, the band-pass filter 13 used hitherto for the separation of the chrominance signal from the luminance signal is unnecessary. Further, in regard to the sound signal, the sound intermediate frequency filter used hitherto in the sound intermediate frequency signal transmission system and having the steep-rising frequency characteristic can be eliminated or replaced by a filter having a gentle-rising frequency characteristic. Furthermore, the sound trap 5 is also unnecessary due to the fact that the luminance signal and chrominance signal do not include the sound carrier.

The delay line 12 used in the prior art receiver structure shown in FIG. 1 is unnecessary in the novel and improved receiver structure shown in FIG. 2. The reasons therefore will be described with reference to FIG. 4 showing one form of the composite elastic surface wave filter 30.

Figure 4:
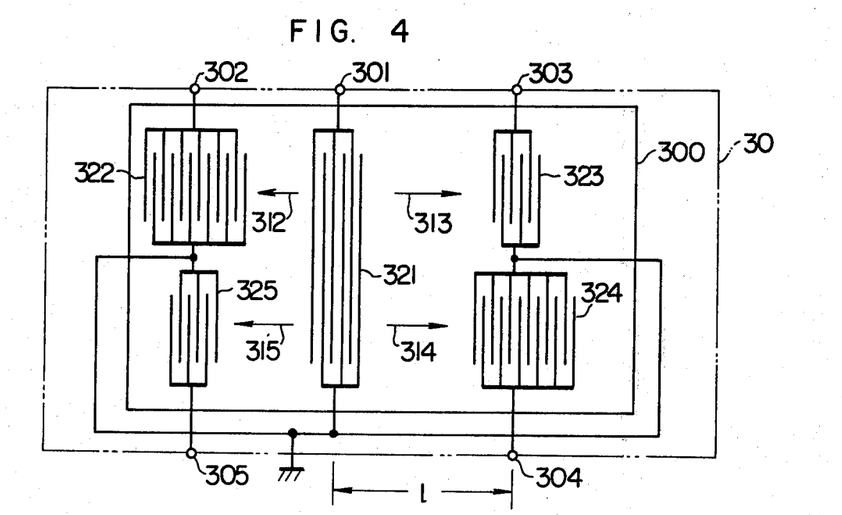
FIG. 4 is a schematic plan view of the composite elastic surface wave filter used in FIG. 2.

Referring to FIG. 4, the reference numeral 300 designates a substrate on which an elastic surface wave can propagate in predetermined directions. This substrate 300 is generally provided in the form of a crystal or the like of a piezo-electric material, and transducers used for the conversion between an electrical signal and an elastic surface wave are formed thereon. An input transducer 321 and a plurality of output transducers 322, 323, 324 and 325 each in the form of a comb-shaped pattern of electrical conductor are disposed on this substrate 300.

In response to the application of the color television signal of picture intermediate frequency from the tuner 2 to the input terminal 301 of the composite elastic surface wave filter 30, the color television signal, which is an electrical signal, is converted by the transducer 321 into an elastic surface wave which propagates on the substrate 300 in directions as shown by the arrows 312, 313, 314 and 315. These elastic surface waves are converted into respective electrical signals again by the transducers 322, 323, 324 and 325, and these electrical signals appear at the respective output terminals 302, 303, 304 and 305.

Among the transducers 321 to 325 formed between the input terminal 301 and the output terminals 302 to 305 to constitute the filters, the function of the sound signal extracting filter formed between the input terminal 301 and the output terminal 305 will merely be described as a representative of these filters. The filtering characteristic of the filter formed between the input terminal 301 and the output terminal 305 of the composite filter 30 is determined by the property of the path of propagation of the elastic surface wave between the input transducer 321 and the output transducer 325. Attenuation of an elastic surface wave along a propagation path on such substrate and scattering of a beam along such path is generally negligible, and in the case of a signal such as a color television signal using a relatively narrow frequency band, these losses relative to the frequency can be generally regarded to be constant. Therefore, the filtering characteristic of the filter is determined by the shape of the input transducer 321 and output transducer 325. These transducers 321 and 325 are called comb-shaped transducers in which a pair of conductors arranged in comb-like pattern are assembled in such a manner that the teeth of one of the combs are each inserted between the corresponding ones of the other comb. Thus, various filtering characteristics can be obtained as desired by suitably selecting the spacing between the conductor portions arranged in the form of the comb, and the length and number of these conductor portions. Further, the delay time of the electrical signal transmitted along the path leading from the input terminal 301 to the output terminal 305 is determined by the factors including the cut of the crystal forming the substrate 300, the direction of propagation of the elastic surface wave, and the distance $l$ between the input transducer 321 and the output transducer 325. The same applies to the picture carrier extracting filter, luminance signal extracting filter and chrominance signal extracting filter. The design of such elastic surface wave filter is described in, for example, IEEE Trans. SU-20, No. 2, pp 80 – 93 (1973).

Therefore, the delay line 12 in FIG. 1 can be eliminated when the output transducers 323 and 324 are disposed on the substrate 300 in such a relationship that the sum of the delay time of the luminance signal propagating in the form of the elastic surface wave from the input transducer 321 to the output transducer 323 and the delay time of the luminance signal transmitted in the form of the electrical signal from the output terminal 303 to the matrix circuit 15 is equal to the sum of the delay time of the color-difference signals propagating in the form of the elastic surface wave from the input transducer 321 to the output transducer 324 and the delay time of the color-difference signals transmitted in the form of the electrical signal from the output terminal 304 to the matrix circuit 15.

The composite elastic surface wave filter 30 having such structure can be easily manufactured utilizing the photo-etching technique, and any adjustment on the product is entirely unnecessary.

It will be understood from the above description that the employment of the composite elastic surface wave filter 30 in the color television receives according to the present invention eliminates the prior art necessity for provision of the elements including the picture intermediate frequency filter 3, sound trap 5 and delay line 12 consisting of the LC combination. Therefore, the signal processing circuit of such color television receiver can be made adjustment-free and can be integrated into desired integrated circuit form. Thus, the manufacture of the color television receiver can be remarkably rationalized.

Figure 5:
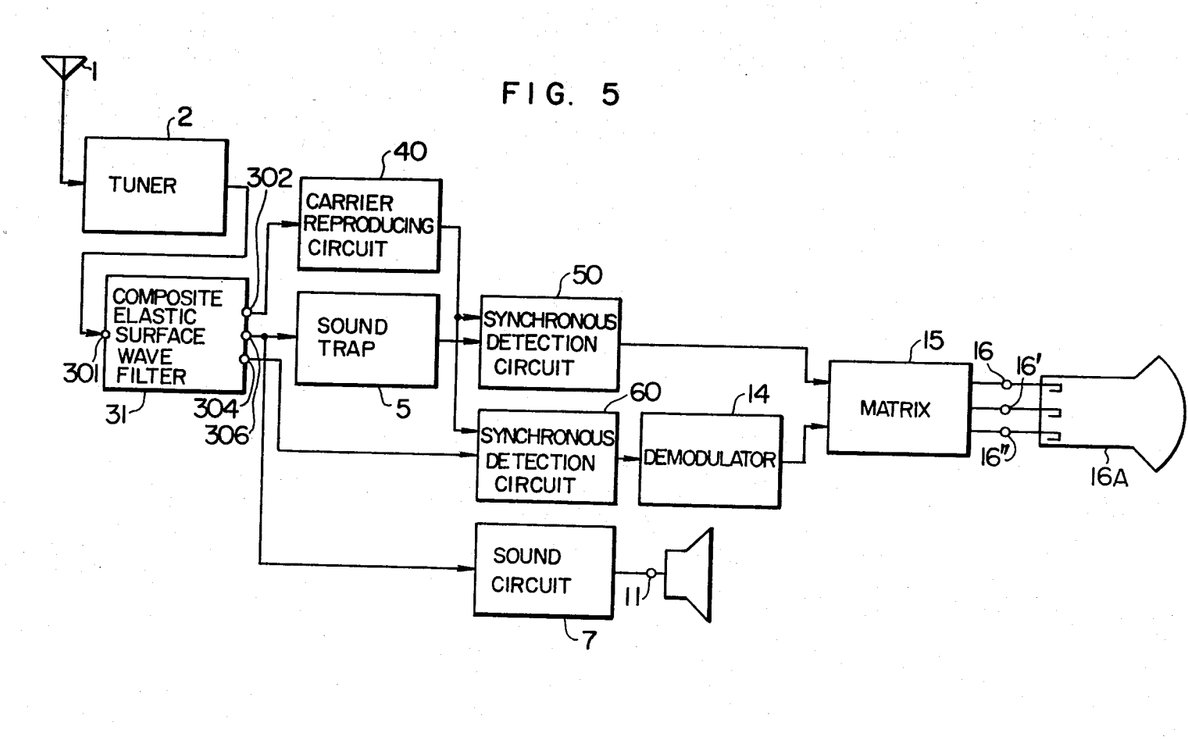
FIG. 5 is a block diagram showing the structure of another preferred embodiment of the present invention.

FIG. 5 is a block diagram showing the structure of another preferred embodiment of the present invention in which a luminance signal and a sound signal are separated from a chrominance signal in a composite elastic surface wave filter to appear at the same output terminal. In FIG. 5 like reference numerals are used to denote like parts appearing in FIG. 2.

Figure 6:
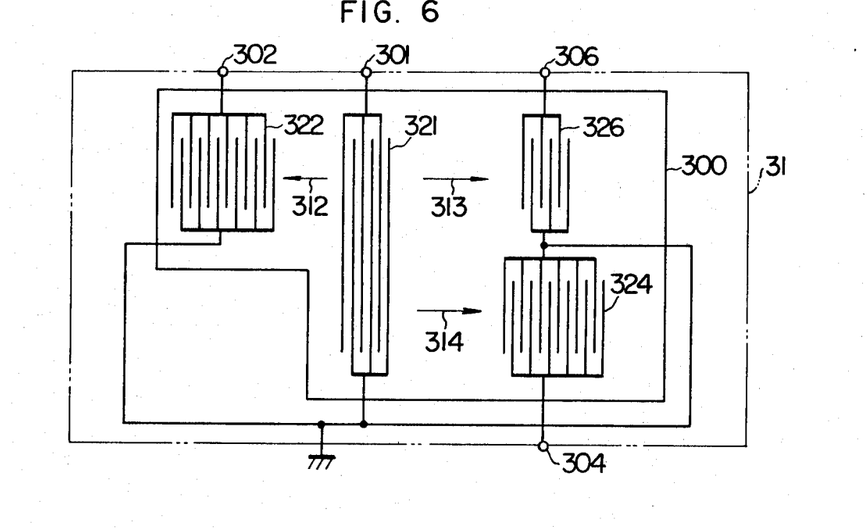
FIG. 6 is a schematic plan view of the composite elastic surface wave filter used in FIG. 5.

This embodiment comprises a composite elastic surface wave filter 31 having a structure as shown in FIG. 6. This structure is generally similar to that shown in FIG. 4. Referring to FIG. 6, a picture carrier extracting filter and a chrominance signal extracting filter are respectively formed between an input terminal 301 and an output terminal 302 and between the input terminal 301 and another output terminal 304 as in the case of FIG. 4. A sound signal and luminance signal extracting filter is formed between the input terminal 301 and another output terminal 306. This filter has a frequency characteristic as shown by the dotted curve E in FIG. 3. The main peak $E_1$ represents the extracted luminance signal, and the first side-lobe $E_2$ represents the extracted sound signal which is attenuated relative to the main peak $E_1$ by about 26 dB. Therefore, when the output appearing at the output terminal 306 is applied directly to a sound circuit 7, the sound signal can be obtained. Further, the luminance signal can be obtained by applying the output appearing at the output terminal 306 to a sound trap 5 and then subjecting the output of the sound trap 5 to synchronous detection in a synchronous detection circuit 50 using a reference carrier applied from a carrier reproducing circuit 40.

As described previously, such an elastic surface wave filter 31 having frequency characteristics as shown in FIG. 3 can be easily obtained. Further, the output transducers 324 and 326 can be disposed on the substrate 300 to provide such a relationship that the delay time of the color-difference signals applied to the matrix circuit 15 is equal to that of the luminance signal applied to the matrix circuit 15. Therefore, the composite elastic surface wave filter 31 which is adjustment-free can replace the picture intermediate frequency filter 3 consisting of the LC combination used in the prior art color television receiver, and the band-pass filter 13 and delay line 12 can be eliminated.

Figure 7:
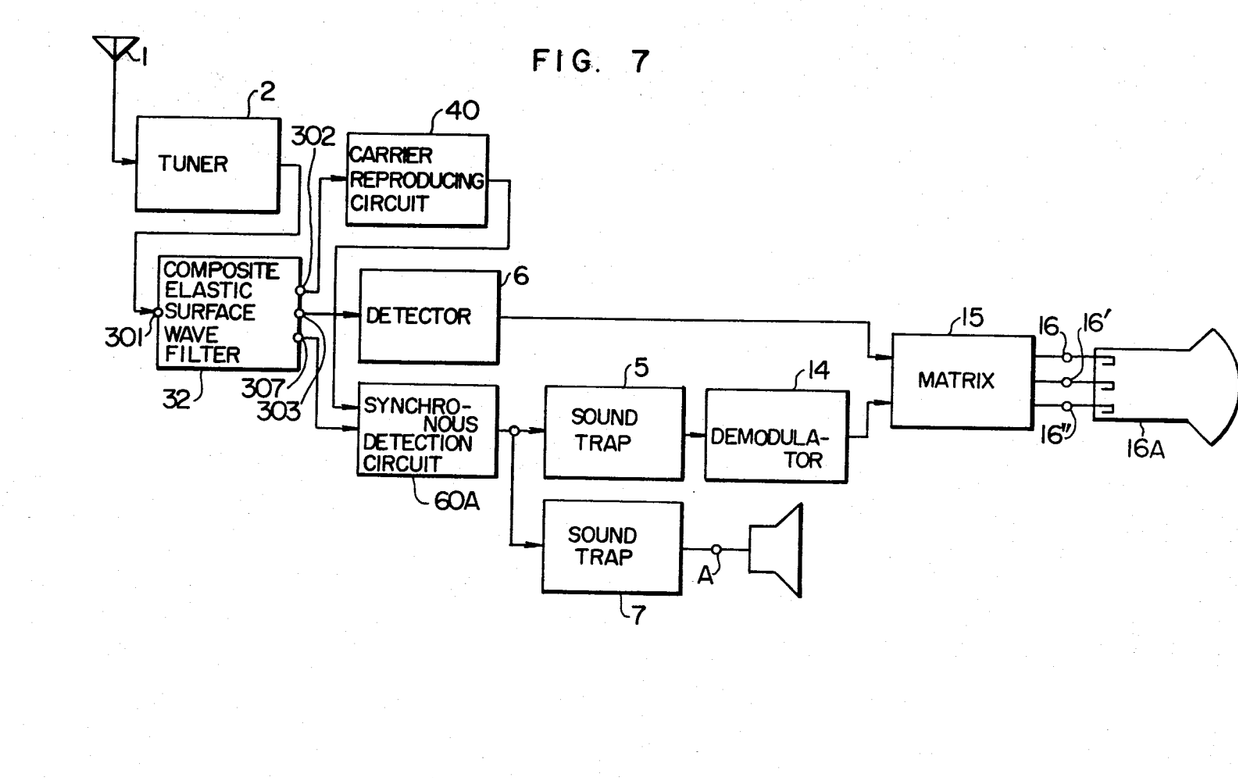
FIG. 7 is a block diagram showing the structure of still another preferred embodiment of the present invention.

FIG. 7 is a block diagram showing the structure of still another preferred embodiment of the present invention in which a chrominance signal and a sound signal are separated from a luminance signal in a composite elastic surface wave filter to appear at the same output terminal. In FIG. 7, like reference numerals are used to denote like parts appearing in FIG. 2.

Figure 8:
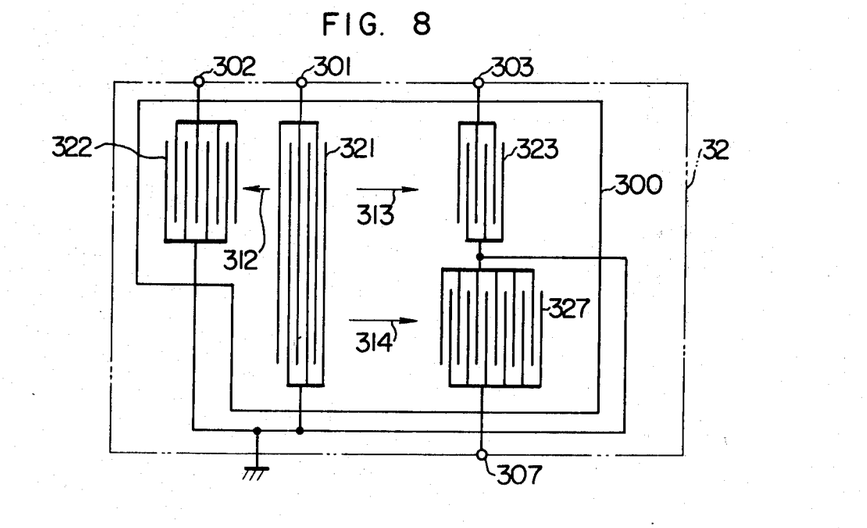
FIG. 8 is a schematic plan view of the composite elastic surface wave filter used in FIG. 7.

This embodiment comprises a composite elastic surface wave filter 32 having a structure as shown in FIG. 8. This filter structure is generally similar to that shown in FIG. 6. Referring to FIG. 8, a chrominance signal and sound signal extracting filter is formed between an input terminal 301 and an output terminal 307 and has a frequency characteristic as shown by the one-dot chain line curve F in FIG. 3. The output appearing at the output terminal 307 consists of the chrominance signal and sound signal. These signals are applied to a synchronous detection circuit 60A to be subjected to synchronous detection and are then applied to a sound circuit 7 directly and to a chrominance signal demodulating circuit 14 through a sound trap 5. This sound trap 5 prevents generation of an undesirable beat signal having a frequency corresponding to the frequency difference between the color-difference signals and the sound signal. The output appearing at an output terminal 303 is subjected to envelope detection in an envelope detection circuit 6 to provide the luminance signal.

It is apparent that, in this case too, the picture intermediate frequency filter 3, band-pass filter 13 and delay line 12 required in the prior art color television receiver are unnecessary.

While the chrominance signal and sound signal are subjected to the synchronous detection in the embodiments of the present invention described hereinbefore, the present invention is equally effective even when these signals may be subjected to envelope detection. In such a case, however, the chrominance signal and sound signal derived from the composite elastic surface wave filter 30, 31, 32 must be added to the reference carrier applied from the carrier reproducing circuit 40 before being subjected to the envelope detection due to the fact that these signals do not include the picture carrier.

Figure 9:
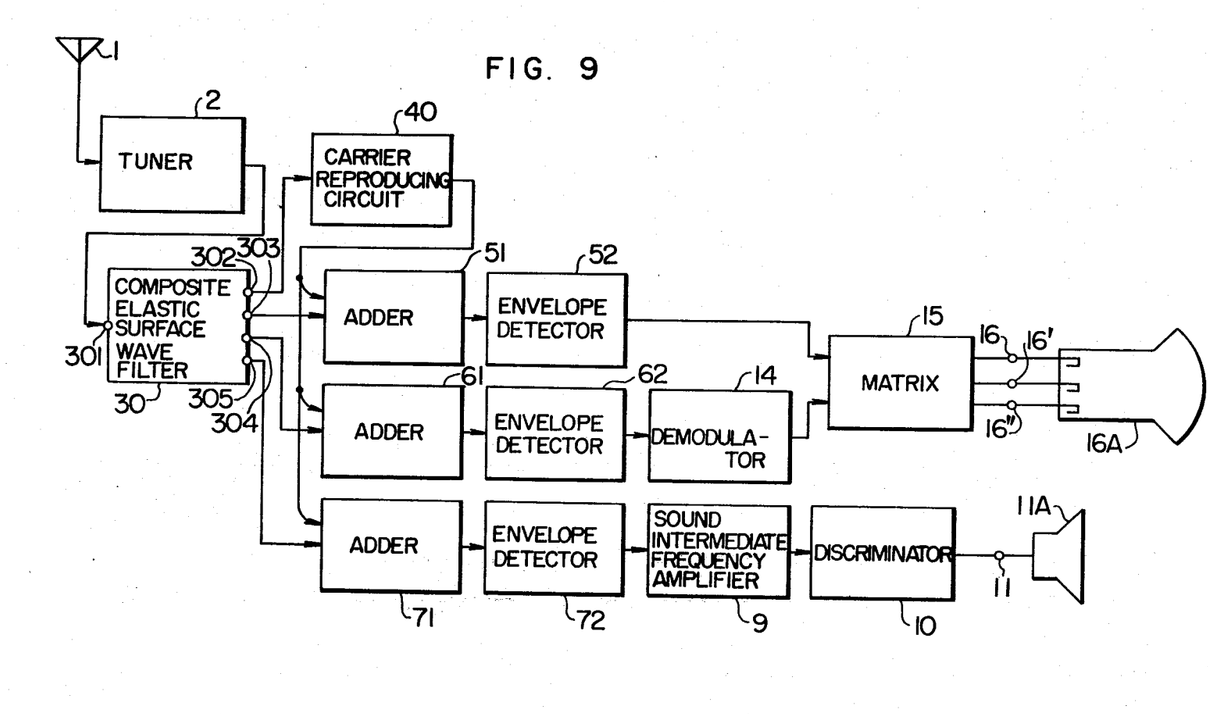
FIGS. 9 to 11 are block diagrams showing the structure of other embodiments of the present invention in which an envelope detector is used in place of the synchronous detector employed in the embodiments shown in FIGS. 2, 5 and 7 respectively.
Figure 10:
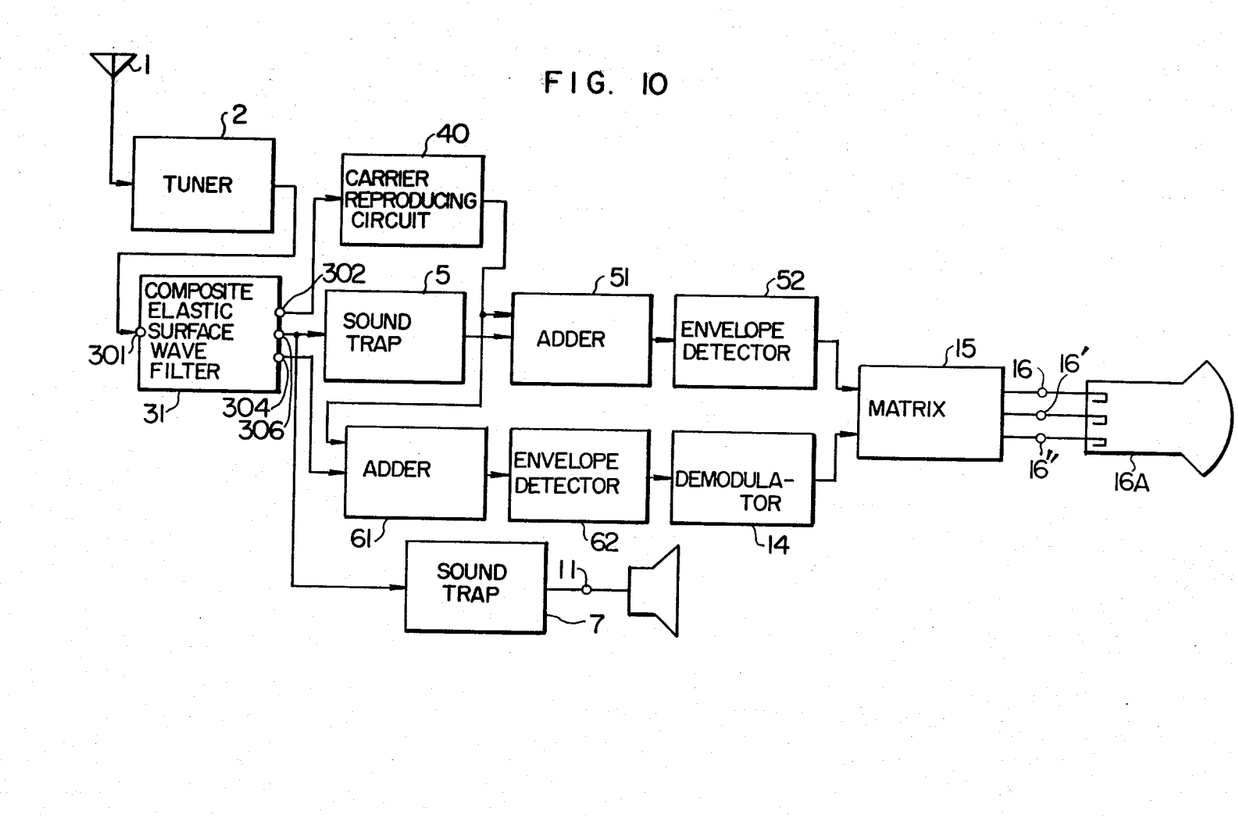
Figure 11:
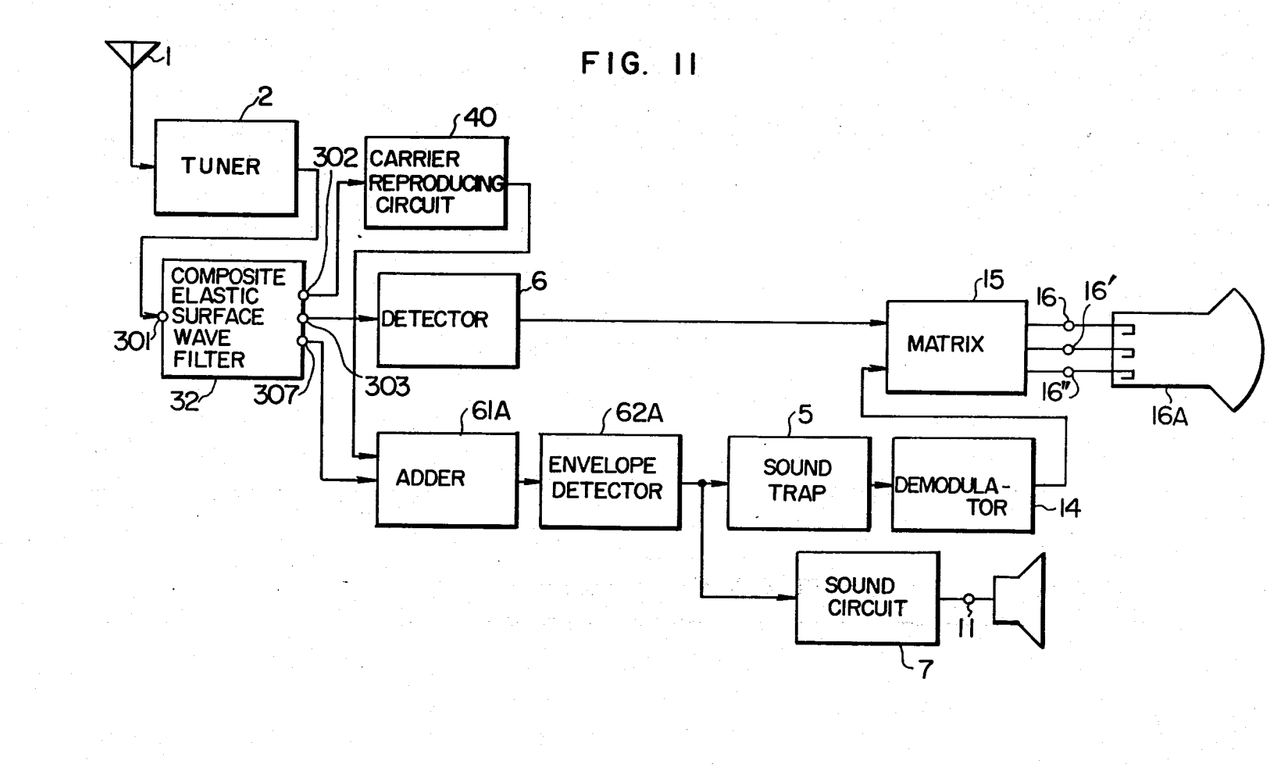

Other embodiments of the present invention are shown in FIGS. 9, 10 and 11 in which the synchronous detection circuits 50, 60, 70 and 60A in FIGS. 2, 5 and 7 are each replaced respectively by an adder circuit and an envelope detection circuit.

Referring to FIG. 9, the synchronous detection circuits 50, 60 and 70 in FIG. 2 are replaced respectively by an adder circuit 51 and an envelope detection circuit 52, an adder circuit 61 and an envelope detection circuit 62, and an adder circuit 71 and an envelope detection circuit 72. Referring to FIG. 10, the synchronous detection circuits 50 and 60 in FIG. 5 are replaced respectively by an adder circuit 51 and an envelope detection circuit 52, and an adder circuit 61 and an envelope detection circuit 62. Referring to FIG. 11, the synchronous detection circuit 60A in FIG. 7 is replaced by an adder circuit 61A and an envelope detection circuit 62A.

What we claim is:

1. A color television receiver employing an elastic surface wave filter comprising:
   a color television signal source producing a color television signal modulated by a color picture signal including a luminance signal and color-difference signals, said signal source including intermediate frequency signal generating means for generating a picture intermediate frequency signal including the picture carrier in response to the application of said color television signal thereto;

a substrate of material permitting propagation of an elastic surface wave;

first transducer means disposed on said substrate and connected to said color television signal source for converting said color television signal into an elastic surface wave;

second transducer means disposed on said substrate for converting said elastic surface wave into a first electrical signal including the luminance signal of picture intermediate frequency but not including the color-difference signals of picture intermediate frequency in response to the application of said elastic surface wave appearing from said first transducer means and propagating toward it on said substrate;

third transducer means disposed on said substrate for converting said elastic surface wave into a second electrical signal including the color-difference signals of picture intermediate frequency but not including the luminance signal of picture intermediate frequency in response to the application of said elastic surface wave appearing from said first transducer means annd propagating toward it on said substrate;

luminance signal generating means connected to said second transducer means for generating the luminance signal by detecting the electrical signal output of said second transducer means; and color-difference signal generating means connected to said third transducer means for generating the color-difference signals by detecting the electrical signal output of said third transducer means;

wherein fourth transducer means is disposed on said substrate for converting said elastic surface wave applied from said first transducer means thereto into a third electrical signal including solely the picture carrier of picture intermediate frequency and not including the luminance signal and color-difference signals of picture intermediate frequency, and wherein said color-difference signal generating means generates the color-difference signals by detecting said second electrical signal utilizing said third electrical signal.

2. A color television receiver as claimed in claim 1, wherein said color-difference signal generating means comprises a synchronous detection circuit to which said second and third electrical signals are applied for the synchronous detection of said second electrical signal.

3. A color television receiver as claimed in claim 1, wherein said color-difference signal generating means comprises an adder circuit for adding said third electrical signal to said second electrical signal, and an envelope detection circuit for carrying out the envelope detection of the output signal of said adder circuit representing the result of addition of said second and third electrical signals.

4. A color television receiver employing an elastic surface wave filter comprising:
a. picture intermediate frequency signal generating means for generating a picture intermediate frequency signal in response to the application of a color television signal modulated by a color picture signal including color-difference signals and a luminance signal;

b. a transducer assembly comprising
1. a substrate of material permitting propagation of an elastic surface wave,
2. first transducer means connected to said picture intermediate frequency signal generating means for converting said picture intermediate frequency signal into an elastic surface wave,
3. second transducer means disposed on said elastic surface wave propagating substrate for converting said elastic surface wave into a first electrical signal including the luminance signal of picture intermediate frequency but not including the chrominance signal of picture intermediate frequency, and
4. third transducer means disposed on said elastic surface wave propagating substrate for converting said elastic surface wave into a second electrical signal including the chrominance signal of picture intermediate frequency but not including the luminance signal of picture intermediate frequency;

c. luminance signal generating means connected to said second transducer means for generating the luminance signal by detecting said first electrical signal; and d. color-difference signal generating means connected to said third transducer means for generating the chrominance signal by detecting said second electrical signal and then generating the color-difference signals from the detected chrominance signal, wherein said signal source comprises picture intermediate frequency signal generating means for generating a picture intermediate frequency signal including the picture carrier, wherein fourth transducer means is disposed on said substrate for converting said elastic surface wave applied from said first transducer means thereto into third electrical signal including solely the picture carrier of picture intermediate frequency and not including the luminance signal and chrominance signal of picture intermediate frequency, and wherein said color-difference signal generating means generates the chrominance signal by detecting said second electrical signal utilizing said third electrical signal and then generates the color-difference signals from said detected chrominance signal.

5. A color television receiver as claimed in claim 4, wherein said color-difference signal generating means comprises a synchronous detection circuit to which said second and third electrical signals are applied for the synchronous detection of said second electrical signal.

6. A color television receiver as claimed in claim 4, wherein said color-difference signal generating means comprises an adder circuit for adding said third electrical signal to said second electrical signal, and an envelope detection circuit for carrying out the envelope detection of the output signal of said adder circuit representing the result of addition of said second and third electrical signals.

7. A color television receiver employing an elastic surface wave filter comprising:
a. picture intermediate frequency signal generating means for generating a picture intermediate frequency signal in response to the application of a color television signal modulated by a color picture signal including color-difference signals and a luminance signal;

b. a transducer assembly comprising
  1. a substrate of material permitting propagation of an elastic surface wave,
  2. first transducer means connected to said picture intermediate frequency signal generating means for converting said picture intermediate frequency signal into an elastic surface wave,
  3. second transducer means disposed on said elastic surface wave propagating substrate for converting said elastic surface wave into a first electrical signal including the luminance signal of picture intermediate frequency but not including the chrominance signal of picture intermediate frequency, and
  4. third transducer means disposed on said elastic surface wave propagating substrate for converting said elastic surface wave into a second electrical signal including the chrominance signal of picture intermediate frequency but not including the luminance signal of picture intermediate frequency;

c. luminance signal generating means connected to said second transducer means for generating the luminance signal by detecting said first electrical signal; and d. color-difference signal generating means connected to said third transducer means for generating the chrominance signal by detecting said second electrical signal and then generating the color-difference signals from the detected chrominance signal, wherein said signal source comprises picture intermediate frequency signal generating means for generating a picture intermediate frequency signal including the picture carrier and sound signal, wherein fourth transducer means is disposed on said substrate for converting said elastic surface wave applied from said first transducer means thereto into a third electrical signal including solely the picture carrier of picture intermediate frequency and not including the luminance signal, chrominance signal and sound signal of picture intermediate frequency, wherein fifth transducer means is further disposed on said substrate for converting said elastic surface wave applied from said first transducer means thereto into a fourth electrical signal including solely the sound signal of picture intermediate frequency and not including the luminance signal, chrominance signal and picture carrier of picture intermediate frequency, and wherein sound signal generating means is connected to said third and fourth transducer means for generating the sound signal by detecting said fourth electrical signal utilizing said third electrical signal.

8. A color television receiver as claimed in claim 7, wherein said color-difference signal generating means comprises a first synchronous detection circuit to which said second and third electrical signals are applied for the synchronous detection of said second electrical signal, said luminance signal generating means comprises a second synchronous detection circuit to which said first and third electrical signals are applied for the synchronous detection of said first electrical signal, and said sound signal generating means comprises a third synchronous detection circuit to which said fourth and third electrical signals are applied for the synchronous detection of said fourth electrical signal.

9. A color television receiver as claimed in claim 7, wherein said color-difference signal generating means comprises a first adder circuit for adding said third electrical signal to said second electrical signal, and a first envelope detection circuit for carrying out the envelope detection of the output signal of said first adder circuit, said luminance signal generating means comprises a second adder circuit for adding said third electrical signal to said first electrical signal, and a second envelope detection circuit for carrying out the envelope detection of the output signal of said second adder circuit, and said sound signal generating means comprises a third adder circuit for adding said third electrical signal to said fourth electrical signal, and a third envelope detection circuit for carrying out the envelope detection of the output signal of said third adder circuit.

10. A color television receiver employing an elastic surface wave filter comprising:

a. picture intermediate frequency signal generating means for generating a picture intermediate frequency signal in response to the application of a color television signal modulated by a color picture signal including color-difference signals and a luminance signal;

b. a transducer assembly comprising
  1. a substrate of material permitting propagation of an elastic surface wave,
  2. first transducer means connected to said picture intermediate frequency signal generating means for converting said picture intermediate frequency signal into an elastic surface wave,
  3. second transducer means disposed on said elastic surface wave propagating substrate for converting said elastic surface wave into a first electrical signal including the luminance signal of picture intermediate frequency but not including the chrominance signal of picture intermediate frequency, and
  4. third transducer means disposed on said elastic surface wave propagating substrate for converting said elastic surface wave into a second electrical signal including the chrominance signal of picture intermediate frequency but not including the luminance signal of picture intermediate frequency;

c. luminance signal generating means connected to said second transducer means for generating the luminance signal by detecting said first electrical signal; and d. color-difference signal generating means connected to said third transducer means for generating the chrominance signal by detecting said second electrical signal and then generating the color-difference signals from the detected chrominance signal, wherein said signal source comprises picture intermediate frequency signal generating means for generating a picture intermediate frequency signal including the sound signal, wherein fourth transducer means is disposed on said substrate for converting said elastic surface wave applied from said first transducer means thereto into a third electrical signal including solely the picture carrier of picture intermediate frequency and not including the luminance signal, chrominance signal and sound signal of picture intermediate frequency, wherein said second transducer means converts said elastic surface wave propagating on said substrate into said first electrical signal including the sound signal of picture intermediate frequency in addition to the luminance signal of picture intermediate frequency, wherein sound trap means is provided for attenuating the sound signal of picture intermediate frequency in said first electrical signal in response to the application of said first electrical signal, wherein said luminance signal generating means generates the luminance signal by detecting said first electrical signal passed through said sound trap means, wherein sound signal generating means is provided for generating the sound signal in response to the application of said first electrical signal from said second transducer means, and wherein said color-difference signal generating means is connected to said third transducer means for generating the color-difference signals by detecting said second electrical signal utilizing said third electrical signal.

11. A color television receiver as claimed in claim 10, wherein said color-difference signal generating means comprises a first synchronous detection circuit to which said second and third electrical signals are applied for the synchronous detection of said second electrical signal, and said luminance signal generating means comprises a second synchronous detection circuit to which said first electrical signal passed through said sound trap means is applied together with said third electrical signal for the synchronous detection of said first electrical signal in which the sound signal of picture intermediate frequency is attenuated by said sound trap means.

12. A color television receiver as claimed in claim 10, wherein said color-difference signal generating means comprises a first adder circuit for adding said third electrical signal to said second electrical signal, and a first envelope detection circuit for carrying out the envelope detection of the output signal of said first adder circuit, and said luminance signal generating means comprises a second adder circuit for adding said third electrical signal to said first electrical signal passed through said sound trap means, and a second envelope detection circuit for carrying out the envelope detection of the output signal of said second adder circuit.

13. A color television receiver employing an elastic surface wave filter comprising:
 a. picture intermediate frequency signal generating means for generating a picture intermediate frequency signal in response to the application of a color television signal modulated by a color picture signal including color-difference signals and a luminance signal;
 b. a transducer assembly comprising
  1. a substrate of material permitting propagation of an elastic surface wave,
  2. first transducer means connected to said picture intermediate frequency signal generating means for converting said picture intermediate frequency signal into as elastic surface wave,
  3. second transducer means disposed on said elastic surface wave propagating substrate for converting said elastic surface wave into a first electrical signal including the luminance signal of picture intermediate frequency but not including the chrominance signal of picture intermediate frequency, and
  4. third transducer means disposed on said elastic surface wave propagating substrate for converting said elastic surface wave into a second electrical signal including the chrominance signal of picture intermediate frequency but not including the luminance signal of picture intermediate frequency;
 c. luminance signal generating means connected to said second transducer means for generating the luminance signal by detecting said first electrical signal; and
 d. color-difference signal generating means connected to said third transducer means for generating the chrominance signal by detecting said second electrical signal and then generating the color-difference signals from the detected chrominance signal,
 wherein said signal source comprises picture intermediate frequency signal generating means for generating a picture intermediate frequency signal including the picture carrier and sound signal, wherein fourth transducer means is disposed on said substrate for converting said elastic surface wave applied from said first transducer means thereto into a third electrical signal including solely the picture carrier of picture intermediate frequency and not including the luminance signal, chrominance signal and sound signal of picture intermediate frequency, wherein said third transducer means converts said elastic surface wave propagating on said substrate into said second electrical signal including the sound signal of picture intermediate frequency in addition to the chrominance signal of picture intermediate frequency, wherein said color-difference signal generating means generates a mixture signal consisting of a mixture of the chrominance signal and sound intermediate frequency signal by detecting said second electrical signal utilizing said third electrical signal, said color difference signal generating means comprising sound trap means for attenuating the sound intermediate frequency signal in said mixture signal so as to convert the output of said sound trap means into the color-difference signals, and wherein sound signal generating means is provided for generating the sound signal in response to the application of said mixture signal consisting of the mixture of the chrominance signal and sound intermediate frequency signal.

14. A color television receiver as claimed in claim 13, wherein said color-difference signal generating means comprises a synchronous detection circuit to which said second and third electrical signals are applied for the synchronous detection of said second electrical signal.

15. A color television receiver as claimed in claim 13, wherein said color-difference signal generating means comprises an adder circuit for adding said third electrical signal to said second electrical signal, and an envelope detection circuit for carrying out the envelope detection of the output signal of said adder circuit.

16. A color television receiver employing an elastic surface wave filter comprising:
 a. picture intermediate frequency signal generating means impressed with a color television signal in which a picture carrier is modulated by a chrominance signal and a luminance signal for generating a picture intermediate frequency signal corresponding to the color television signal;

b. a transducer assembly comprising
  1. a substrate of material permitting propagation of an elastic surface wave;
  2. first transducer means connected to said substrate and impressed with said picture intermediate frequency signal for converting said picture intermediate frequency signal into an elastic surface wave which is propagated along a surface of said substrate;
  3. second transducer means disposed on said substrate and impressed with said elastic surface wave propagated from said first transducer means for converting said elastic surface wave into a first electrical signal in which the luminance signal of picture intermediate frequency is included but the chrominance signal of picture intermediate frequency is substantially suppressed;
  4. third transducer means disposed on said substrate and impressed with said elastic surface wave for converting said elastic surface wave into a second electrical signal including the chrominance signal of picture intermediate frequency but not including the luminance signal of picture intermediate frequency, and
  5. fourth transducer means disposed on said substrate and impressed with said elastic surface wave for converting said elastic surface wave into a third electrical signal in which the picture carrier of picture intermediate frequency is included but the chrominance signal and a high frequency component of the luminance signal of picture intermediate frequency is substantially suppressed;
c. luminance signal generating means connected to said second transducer means for generating the luminance signal by detecting said first electrical signal; and
d. chrominance signal generating means connected to said third and fourth transducer means for detecting said chrominance signal from said second and said third electrical signals of picture intermediate frequency.

* * * * *